United States Patent [19]

Simelunas et al.

[11] Patent Number: 4,882,185
[45] Date of Patent: Nov. 21, 1989

[54] METHOD AND APPARATUS FOR SEVERING A COEXTRUSION FOR MAKING AN ENROBED FOOD PIECE

[75] Inventors: William J. Simelunas, Glen Rock; Nicholas R. Polifroni, Cliffside Park; Henry N. Shoiket, Rutherford; Stefan M. Meyer, Lyndhurst, all of N.J.

[73] Assignee: Nabisco Brands, Inc., East Hanover, N.J.

[21] Appl. No.: 110,027

[22] Filed: Oct. 13, 1987

Related U.S. Application Data

[63] Continuation of Ser. No. 507,469, Jun. 24, 1983, abandoned.

[51] Int. Cl.⁴ .................... A21C 11/10; A21D 13/00
[52] U.S. Cl. .................... 426/283; 425/133.1; 425/307; 425/311; 426/94; 426/516
[58] Field of Search .................. 426/282, 283, 94, 512, 426/516; 425/132, 133.1, 307, 311; 264/142

[56] References Cited

U.S. PATENT DOCUMENTS

| | | | |
|---|---|---|---|
| 544,962 | 8/1895 | Copland | 425/132 |
| 1,370,027 | 2/1921 | Locoratolo | 425/285 |
| 1,711,750 | 10/1924 | Schoppner | 425/132 |
| 2,712,693 | 2/1952 | Comparette | 425/308 |
| 3,160,493 | 12/1964 | Kuppers | 65/133 |
| 3,196,810 | 7/1965 | Roth | 425/132 |
| 3,249,068 | 5/1966 | Gembicki | 425/133.1 |
| 3,530,491 | 9/1970 | Rajsa | 425/142 |
| 3,572,259 | 3/1971 | Hayashi | 426/94 |
| 3,778,209 | 12/1973 | Wallace | 425/133.1 |
| 4,251,201 | 2/1981 | Krysizk | 425/132 |

FOREIGN PATENT DOCUMENTS

| | | |
|---|---|---|
| 37-31500 | 11/1962 | Japan . |
| 40-27511 | 12/1965 | Japan . |
| 45-13432 | 5/1970 | Japan . |
| 51-63978 | 6/1976 | Japan . |
| 52-96788 | 8/1977 | Japan . |
| 263578 | 1/1927 | United Kingdom . |

Primary Examiner—George Yeung
Attorney, Agent, or Firm—Richard Kornutik

[57] ABSTRACT

Methods and apparatuses are described for manufacturing, from a coextrusion, food pieces wherein an inner food is fully or partially enrobed by an outer food. In one embodiment the inner food is a dough that is enrobed by an outer dough by severing the outer dough with a blunt severing edge on a severing element which, as it enters the coextrusion, simultaneously draws the outer dough over the inner dough on both sides of the element to form the food piece. A coextrusion of an inner dough inside an outer dough is formed below a die with the extrusion of the inner dough periodically interrupted to form a region in the coextrusion where there is a greater amount of outer dough. A pair of severing elements are operatively located at a predetermined distance below the die where convergence of the severing elements cuts the extrusion in a region having a greater amount of outer dough while simultaneously drawing the outer dough over the inner dough above and below the severing elements. Several embodiments are described.

10 Claims, 14 Drawing Sheets

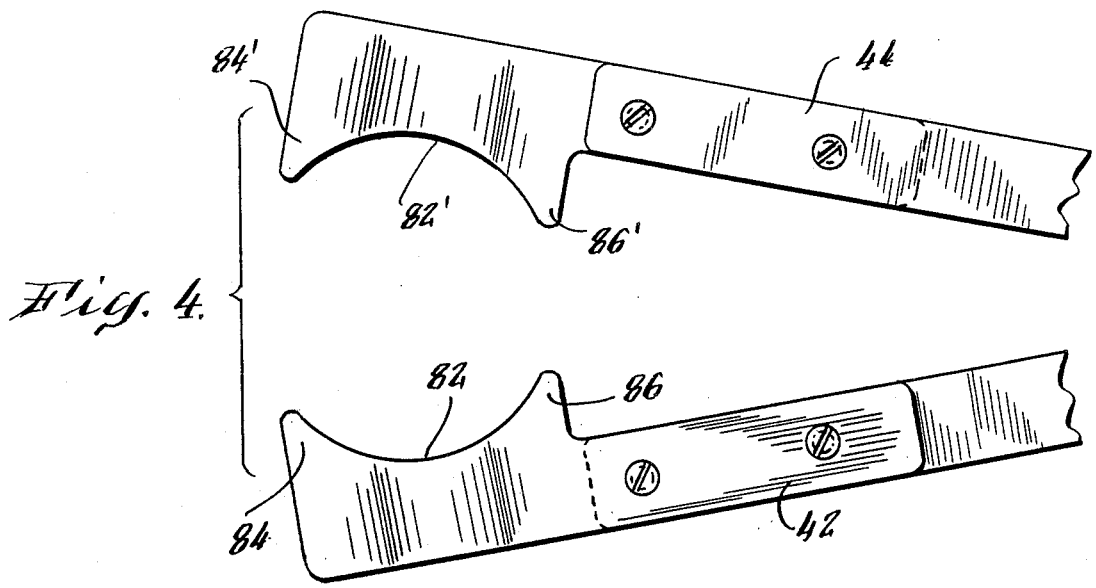
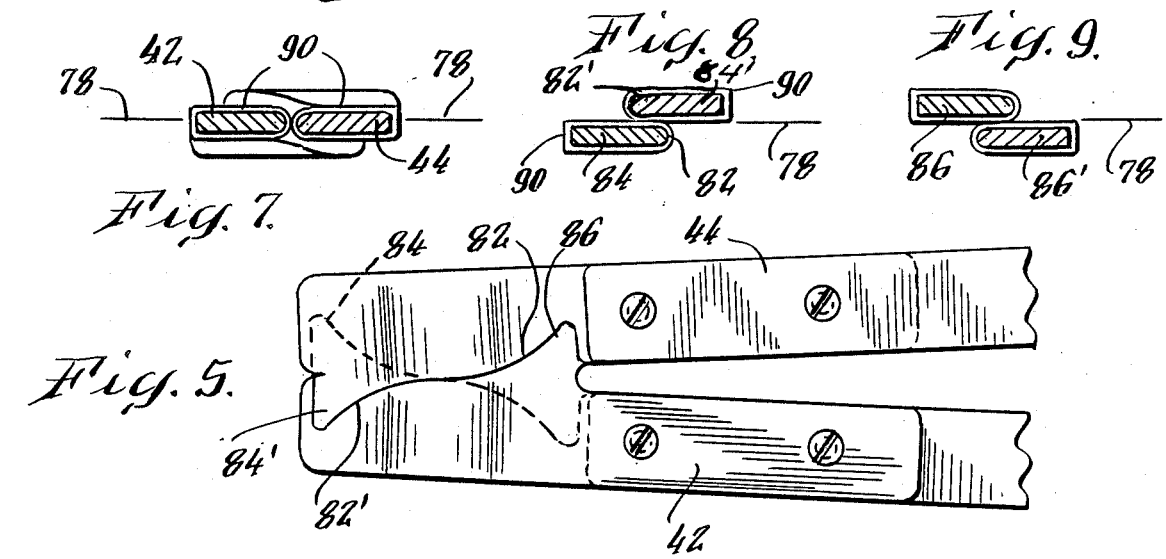
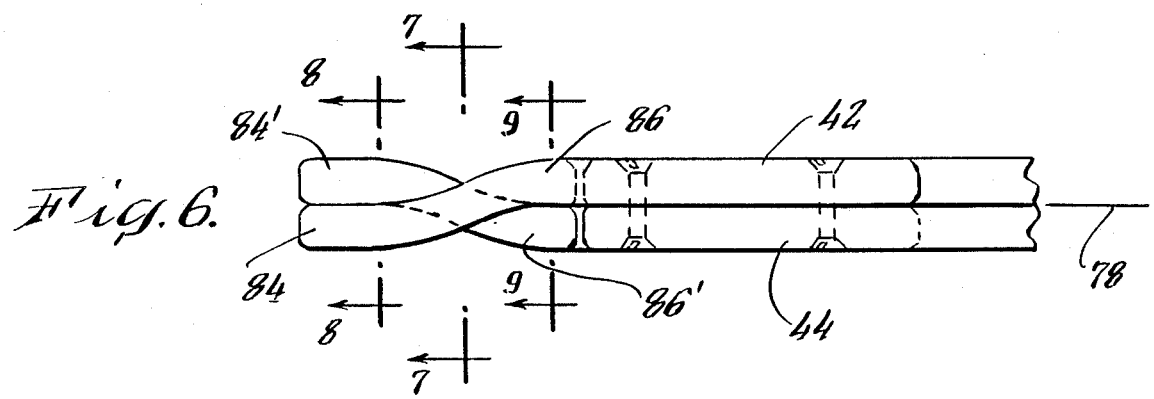

Fig. 11.
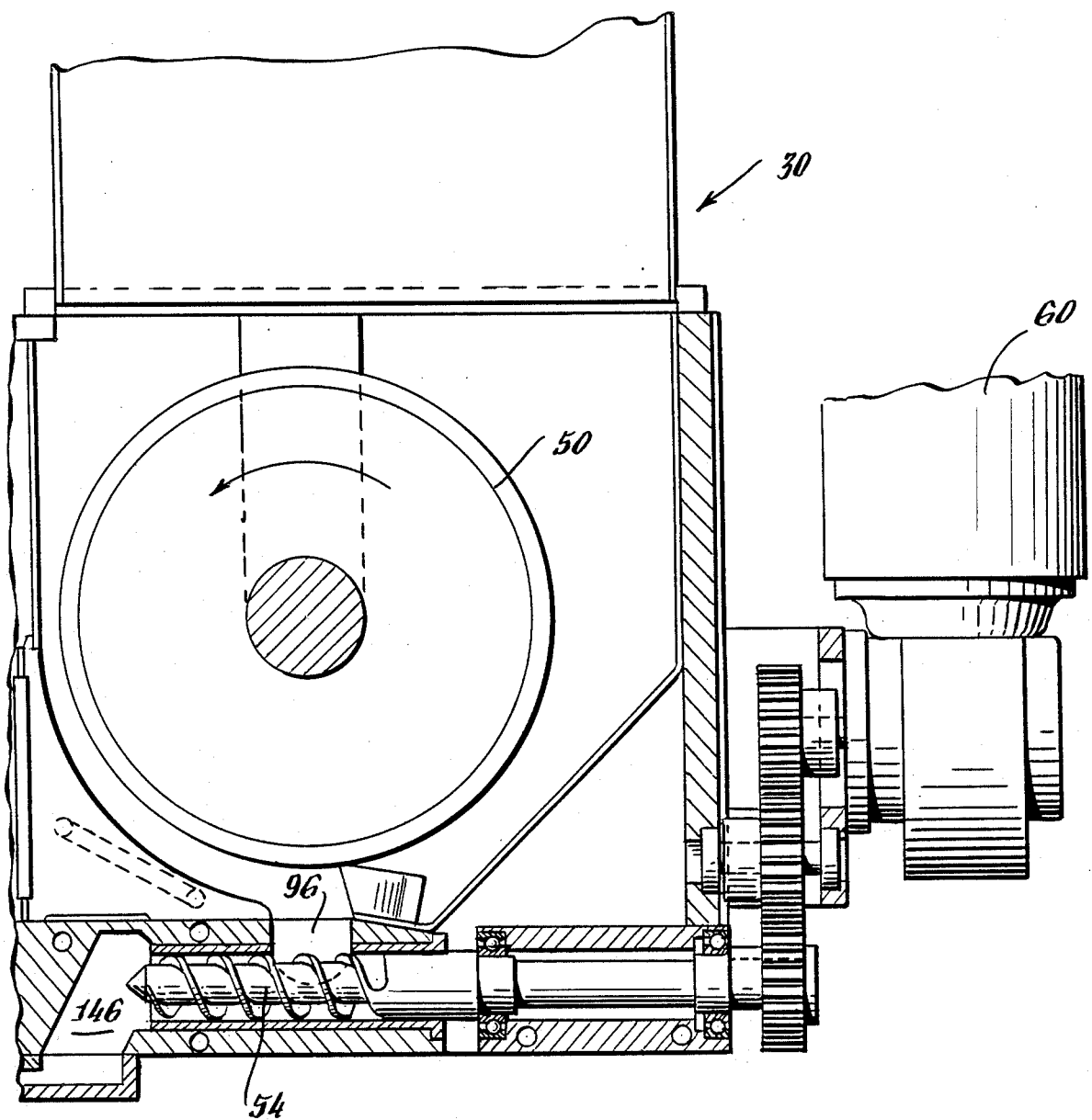
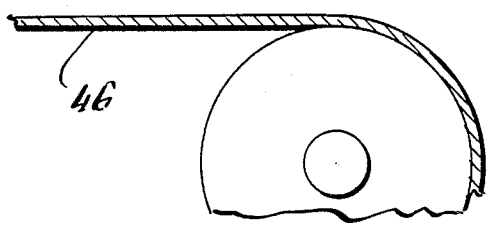

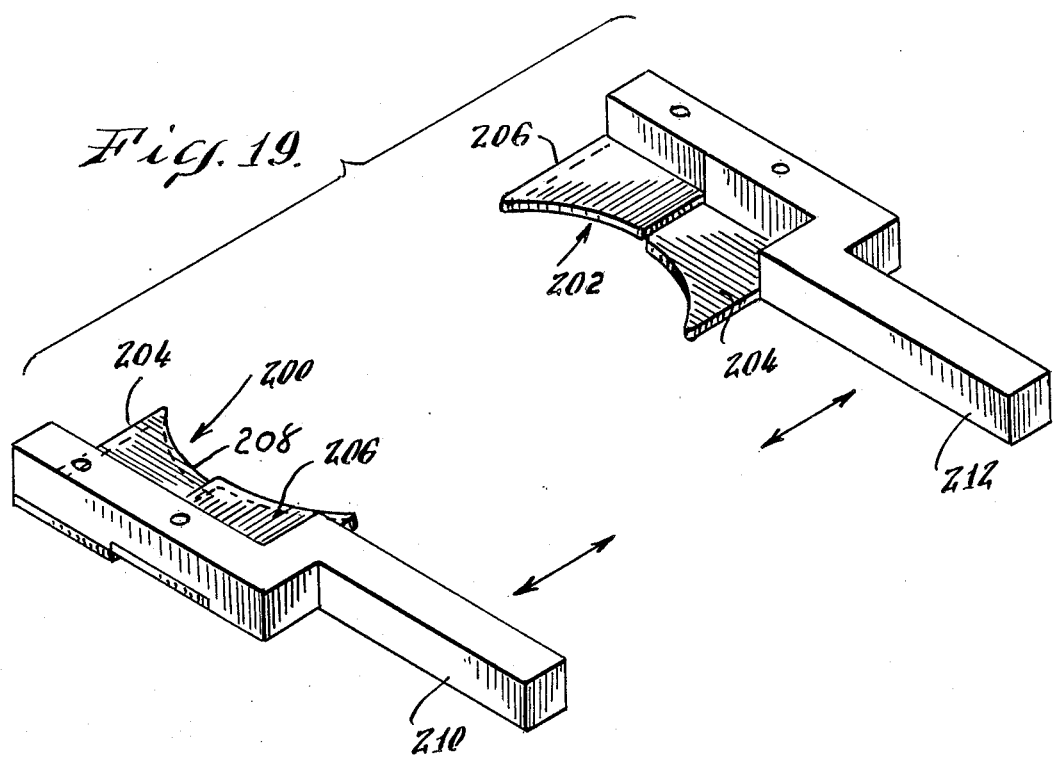
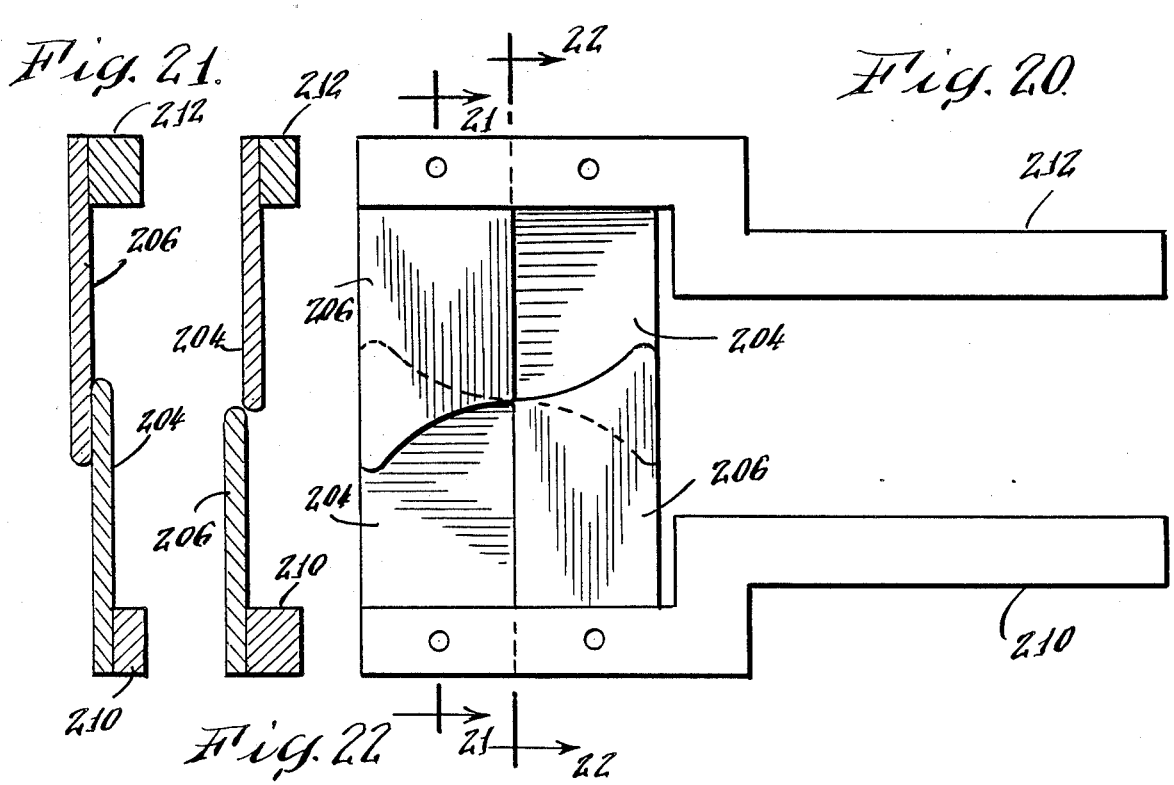

METHOD AND APPARATUS FOR SEVERING A COEXTRUSION FOR MAKING AN ENROBED FOOD PIECE

This is a continuation of copending application Ser. No. 507,469 filed on June 24, 1983, abandoned.

FIELD OF THE INVENTION

This invention generally relates to the processing of coextruded foods to make food pieces wherein an outer food encloses an inner food, either fully or partially, and more specifically, relates to a method and apparatus for making, from a coextrusion, food pieces wherein one dough is partially or substantially enrobed by an outer dough.

BACKGROUND OF THE INVENTION

Food products having one substance on the inside and another on the outside are well known. Processes and machines for making such food products in an automatic manner are also well known. For example, in U.S. Pat. 544,962 to Copland, one food substance such as a jam is deposited inside an outer dough. This is done by first advancing a piston to force dough out of an annular opening onto a pan and then advancing a second piston to force jam through a central opening. The feed of the inner jam is stopped and pulled back by withdrawing the second piston while the outer dough continues to be deposited so as to cause it to overlie the inner jam. A severance from the outer dough of the food piece is obtained by lowering the pan and thus break the outer dough away. Augers are used to aid in supplying the jam and dough to the cylinders in which the pistons operate. A similar apparatus is shown in U.S. Pat. No. 1,711,750 to Schappner.

An improved automatic machine for making filled baked goods is described in U.S. Pat. No. 3,196,810 to Roth. In this patent a plurality of dies are fed with a dough. U.S. Pat. No. 3,778,209 teaches an apparatus for forming a food extrusion in which an inner meat food is totally enrobed by an outer moldable food by using a pair of augers below the food hoppers. Augers are particularly useful for the extrusion of foods such as dough to achieve a consistent quality, reliability and high efficiency in high speed manufacture of snacks such as cookies, chocolate layered foods and the like.

Cutting of extruded foods may involve many well known techniques such as wires or knives which, as they cut, may also shape the extruded food piece; see, for example, British Pat. 263,578 and U.S. Pat. 3,530,491 to Rejsa. The latter describes a forming die located on upper and lower surfaces of scissors placed to cut the end of an extruded food so as to simultaneously form and sever a food piece. Knives with rounded cutting edges are described in U.S. Pat. 1,370,027 to Locoratola for bunching a strip of candy before cutting the strip into sections.

In the manufacture of coextruded food substances it is common to require that the outer food substance encapsulates inner food substance. In U.S. Pat. Nos. or enrobes an inner food substance. In U.S. Pat. Nos. 3,778,209 and 3,249,068 the enrobing action is obtained by controlling the motion of pistons used to feed the coextrusions In U.S. Pat. No. 4,251,201 to Krysiak an enrobed food piece is produced with an apparatus that includes specially sequenced augers used to coextrude an inner and outer food from coaxial dies with the sequence coordinated with an iris shaped cut-off valve that is closely mounted to the discharge ports of the dies. The iris valve cuts the coextrusion just at a time when the feed of both the inner filler and outer coating foods is interrupted and the space in which the valve acts is essentially filled with the outer coating food. This technique appears to depend upon a relatively easy flowability of the outer food substance so as to coat the rear of the inner food while the iris valve is about to close and appears limited in operating speed because the feed of both inner and outer foods must be interrupted for each food piece.

SUMMARY OF THE INVENTION

With an apparatus and method in accordance with the invention, food pieces which are made of an inner food material that is enrobed by an outer food can be rapidly made from a coextrusion of the foods. The apparatus and technique are advantageously applied to large scale manufacture of the food pieces and different types of foods including pet food. Adjustments of the apparatus or the process in order to adapt to different materials used in the food pieces are conveniently made.

In one method for manufacturing food pieces in accordance with the invention, a first dough is coextruded from a die with and inside a second dough in a generally downward direction. The coextrusion that is suspended below the die is then severed at a predetermined distance below the die in a manner such that the outer dough is simultaneously drawn to cover the inner dough both above and below the severing place and thus produce food pieces wherein the inner dough is enrobed by the outer dough.

As described herein with respect to a preferred form of the invention, the rate of flow of the inner dough is periodically interrupted so as to produce a relatively greater amount of outer dough at intervals spaced along the coextrusion. The severing is then done at a time and location below the die where the greater amount of outer dough is present. In this manner the weight of the extrusion below the die and the additional outer dough contribute to the enrobing of the inner dough both above and below the severing place.

One aspect of the invention involves the manufacture of food pieces made by severing a coextrusion of inner and outer foods with severing means that includes a severing element having a bluntly shaped severing edge. As the severing element is applied, the blunt edge severs the coextrusion and draws the outer food over the part of the inner food adjacent the sides of the severing element to produce a food piece wherein the inner food is enrobed by the outer food.

As described herein for one form of the invention, the severing action is obtained with blunt concave shaped elements that converge upon each other and push into the extrusion in a manner so as to draw the outer food inwardly over the inner food. The elements are further shaped so that end portions of each thereof are off-set to opposite sides of a severing plane that can be construed as central to the severing action. In this manner opposing end portions of the blunt severing elements may overlap during severing, but in reverse positions relative to the severing plane. The resulting food pieces may be made close to cylindrical in shape when such shape is desired, yet with the inner food partially or substantially enrobed by the outer food.

An apparatus for severing the coextrusion is advantageously adapted to large scale manufacture. A plurality of food coextrusions are conveniently formed over a conveyor and a plurality of bluntly shaped severing elements are positioned below a plurality of dies from which the coextrusions emerge. The severing elements are jointly operated from a common actuator whose closure of the severing elements is timed with the periodic interruption of the feed of the inner food. A high rate in the production of enrobed food pieces can be obtained.

The materials of which the inner and outer foods are made may be of different character as appears appropriate for the technique of this invention. The inner food may be a jelly or jam and by controlling the shape and action of the severing elements, a partial enrobing may be obtained whereby for each food piece, an upper portion exposes the inner jam.

It is, therefore, an object of the invention to provide a method and apparatus for rapidly making food pieces in which an inner food is substantially or partially enrobed by an outer food and where the food pieces are formed of a coextrusion of the inner and outer foods. It is a further object of the invention to provide a method and apparatus for severing a coextrusion of inner and outer doughs to produce food pieces wherein the inner dough is enrobed by the outer dough.

These and other objects of the invention can be understood from the following description of several illustrative embodiments of the invention described in conjunction with the drawings.

BRIEF DESCRIPTION OF THE DRAWINGS

FIG. 4 is a top plan view of severing elements in accordance with the invention;

FIG. 5 is a top plan view of the severing elements of FIG. 4 in a closed position;

FIG. 6 is a side view in elevation of the severing elements as shown in FIG. 5;

FIGS. 7, 8 and 9 are section views respectively taken along the lines 7—7, 8—8 and 9—9 in FIG. 6;

FIGS. 10 and 11 are respectively left and right side sectional portions of the apparatus of FIG. 1;

FIG. 17A is a block diagram for a control for the apparatus in FIG. 17;

FIG. 19 is a perspective view of an alternate form for severing elements in accordance with the invention;

FIG. 20 is a plan view of the severing elements of FIG. 19 but shown in a closed position;

FIGS. 21 and 22 are section views of severing elements taken respectively along the lines 21—21 and 22—22 in FIG. 20.

DETAILED DESCRIPTION OF DRAWINGS

Figure 1:
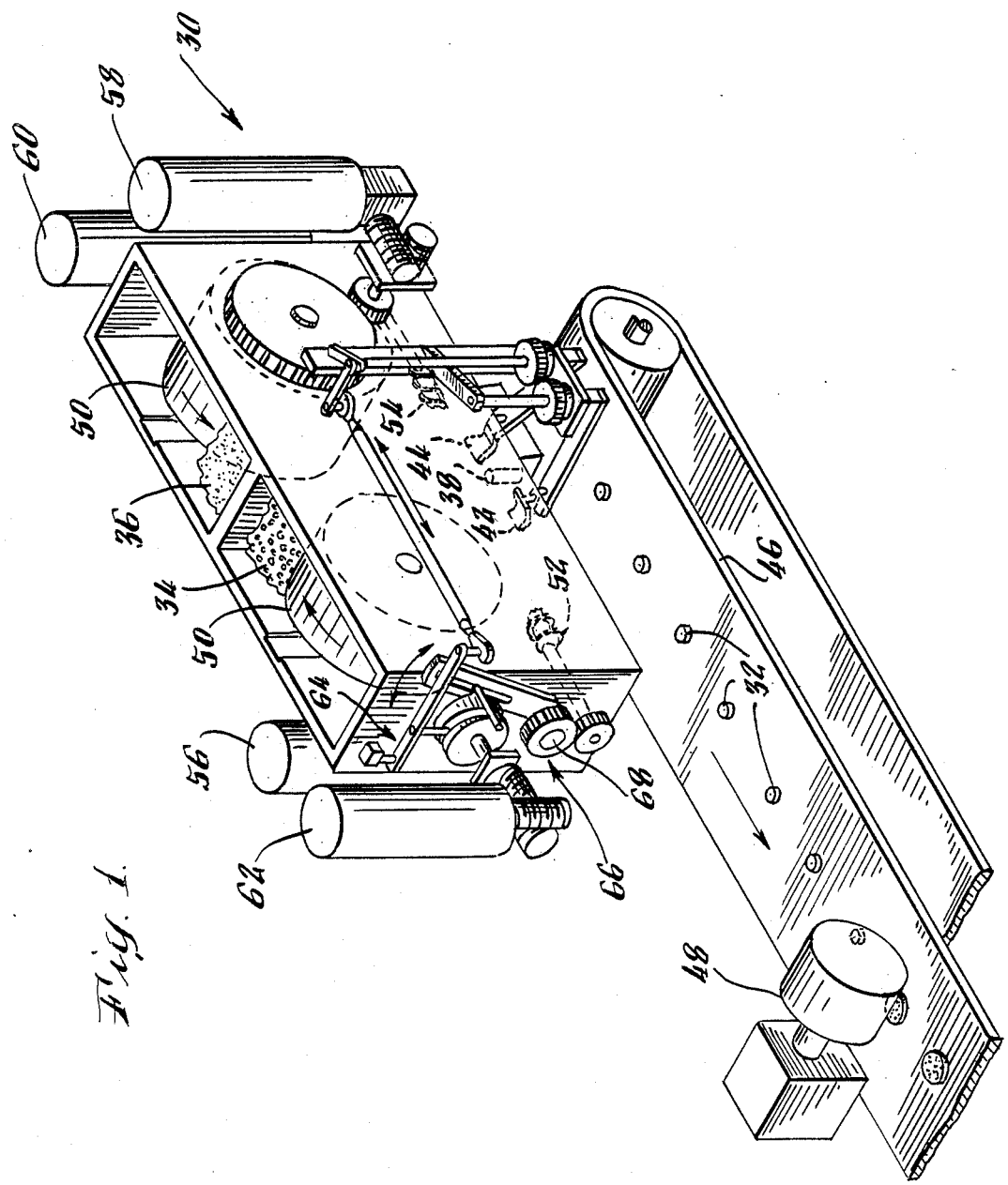
FIG. 1 is a perspective view of an apparatus in accordance with the invention for making food pieces from a coextrusion of foods such as doughs.

With reference to FIG. 1, an illustrative apparatus 30 is shown with which food pieces 32 are formed of an inner dough 34 enrobed by an outer dough 36. The inner dough 34 is coextruded in a downwardly direction with and inside the outer dough 36 to form a coextrusion 38 below a die 40. The coextrusion is suspended below die 40 and is cut by severing elements 42, 44 to form food pieces 32 on a conveyer 46 which transports the food pieces to an oven (not shown). A roller 48 is mounted over conveyor 46 to flatten the food pieces 32 as such flattening appears desirable.

Although not shown in FIG. 1, hoppers may be employed to contain sufficient dough for an effectively continuous production of dough pieces 32. Serrated feed rolls such as 50 are used to supply the inner and outer doughs 34, 36 to auger feeds 52, 54 which in turn supply the die 40 with sufficient dough to provide a continuous coextrusion 38.

The feed rolls 50 are continuously driven by motors 56, 58, generally at a rate sufficient to produce a continuous coextrusion 38. The outer dough auger 54 is driven by a separate motor 60 and similarly inner dough auger 52 is driven by a motor 62. A mechanism 64, driven by motor 62, is used to periodically actuate the severing elements 42, 44 to cut the coextrusion 38.

In apparatus 30 the auger drive for inner dough 34 is made intermittent with a mechanism 66 formed with a one-way clutch 68 rotated back and forth by a crank drive 70. As a result, the extrusion of the inner dough is interrupted at regular intervals and the severing elements 42, 44 are actuated in timed relationship with these intervals.

Figure 2A:
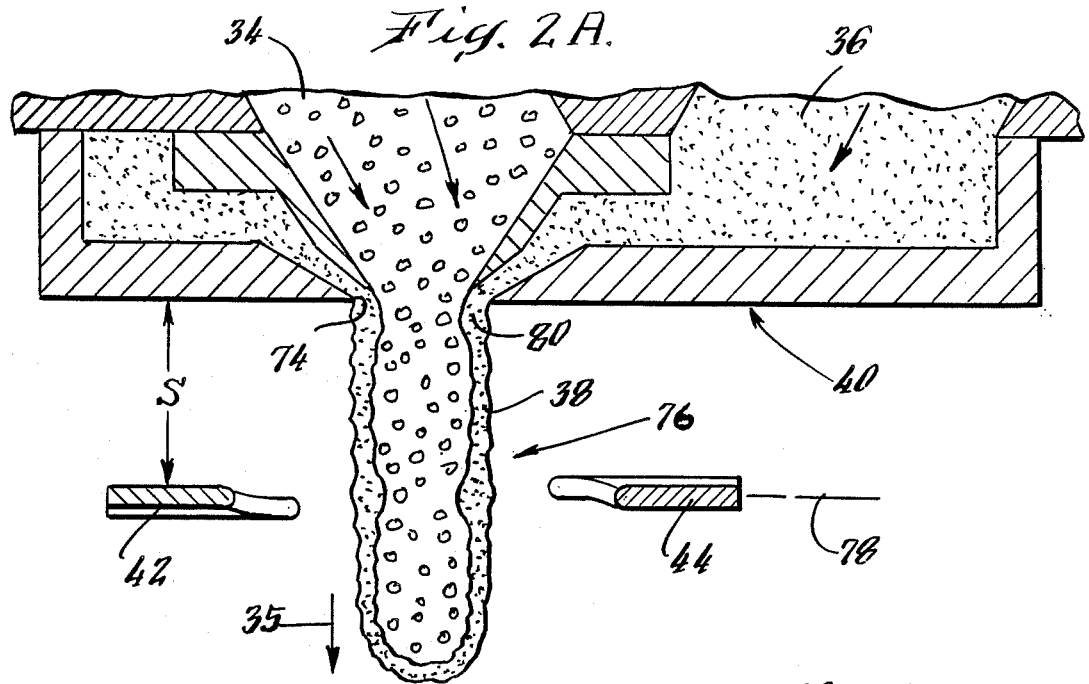
FIGS. 2A, 2B, 2C, 2D and 2E are partial section views of sequential operations of a coextrusion and severing apparatus in accordance with the invention.

Operation and effectiveness of the invention can be understood with reference to FIGS. 2A, 2B, 2C, 2D and 2E. As shown in FIG. 2A, the die 40 has an inner opening 72 through which an inner or filler dough 34 is extruded downwardly in the direction of arrow 35 while outer dough 36 is coextruded through a surrounding opening 74. The resulting coextrusion 38 is shown suspended below die 40 to a severing region 76 where severing elements 42, 44 are operatively located to cut the coextrusion 38 generally along a central severing plane 78.

Figures 2B, 2C:
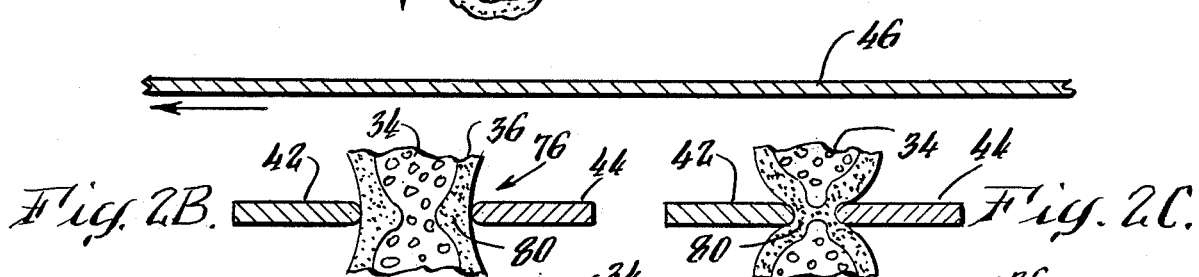
Figure 2D:
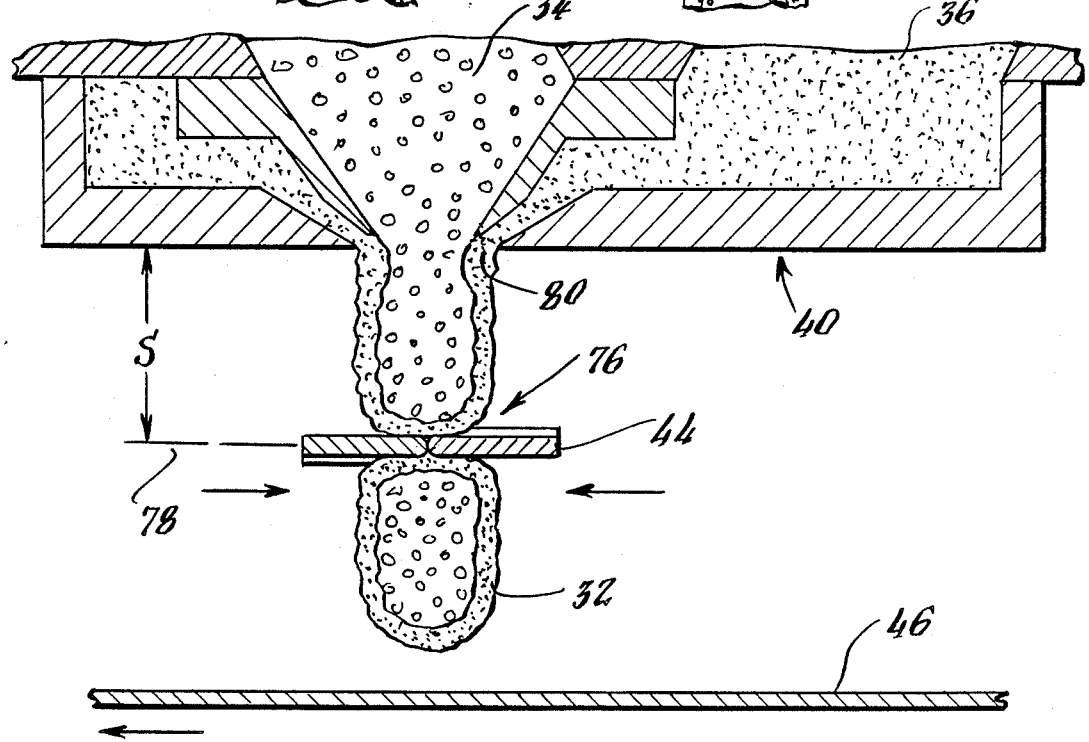
Figure 2E:
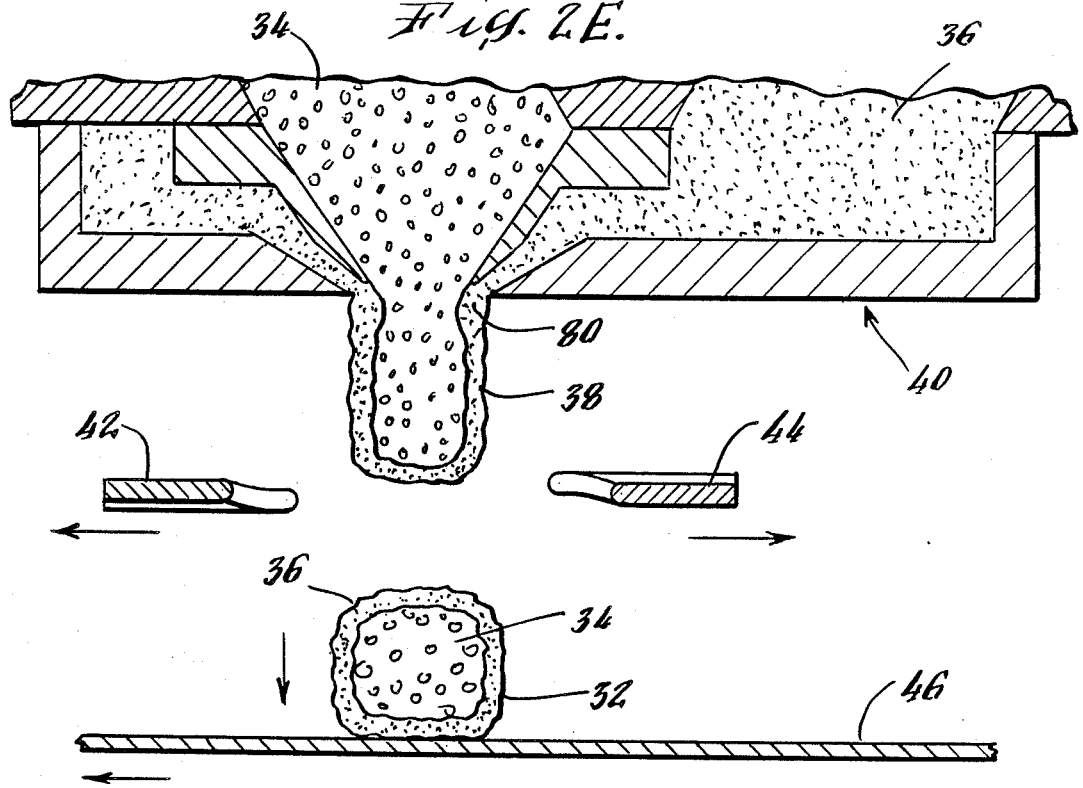

As a result of the periodic interruption of the feed of inner dough 34 while outer dough 36 continues to be extruded, a relatively greater amount of outer dough 36 is extruded in annular regions 80, which became spaced at intervals along extrusion 38 as this energizes die 40. The distance S of severing elements 42, 44 below die 40 preferably is selected so that, as shown in FIGS. 2B and 2C, the elements 42, 44 may engage to sever the coextrusion 38 at a region 80. By severing the coextrusion some distance below die 40, the outer dough 36 becomes more stretchable so that it can be drawn or pushed during closure of severing elements 42, 44, over inner dough 34 both below and above the severing plane 78 and thus cut a food piece 32 off as shown in FIGS. 2D and 2E. The distance S may be varied, but when substantially enrobed food pieces are desired distance S preferably is so set that the severing plane 78 is spaced from die 40 equal to the distance of one interval between successive regions 80. When a partially enrobed food piece is desired, the distance S may be selected so as to sever the coextrusion slightly below regions 80, to thus draw more outer dough to the bottom of a food piece 32 while partially drawing outer dough over the top of a food piece. In this manner exposed areas of inner dough can be formed on top of food pieces 32.

Each severing element 42, 44 has, as shown in FIGS. 3-9 a concave shaped severing edge 82 with an end portion 84 offset along the extrusion direction 35 relative to another end portion 86. The concave shape of severing edges 82, 82' are illustrated as generally parts of a circle in a projection onto the severing plane 78. However, different concave shapes may be useful.

Figure 3A:
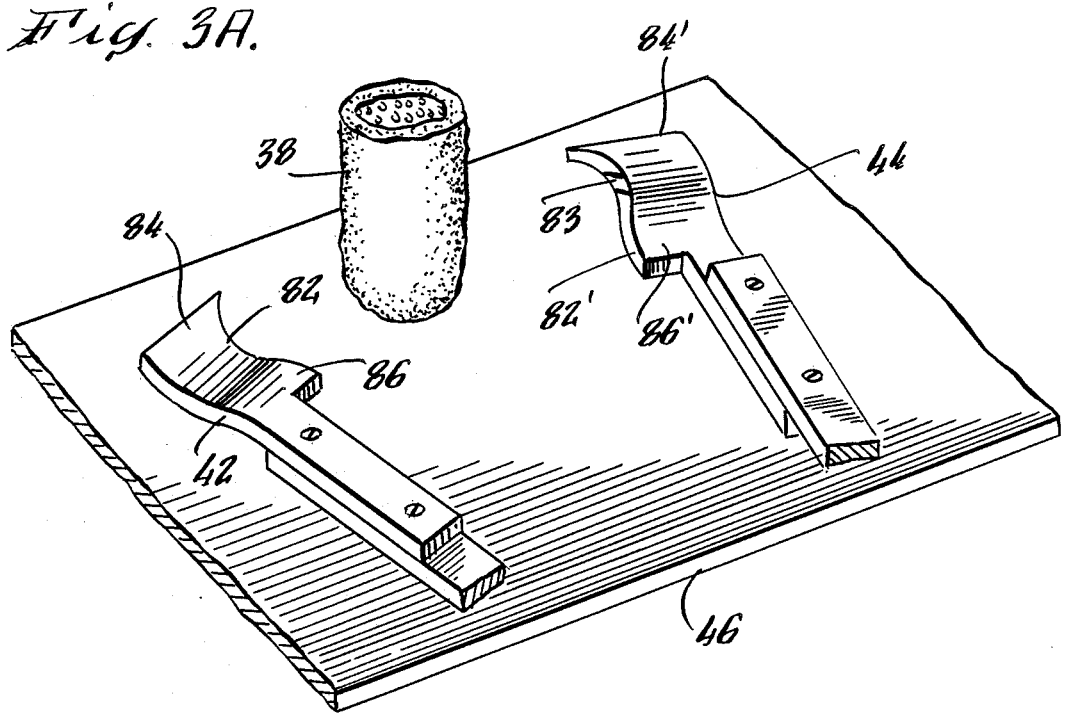
FIGS. 3A and 3B are perspective views of sequential operations of severing elements in accordance with the invention.
Figure 3B:
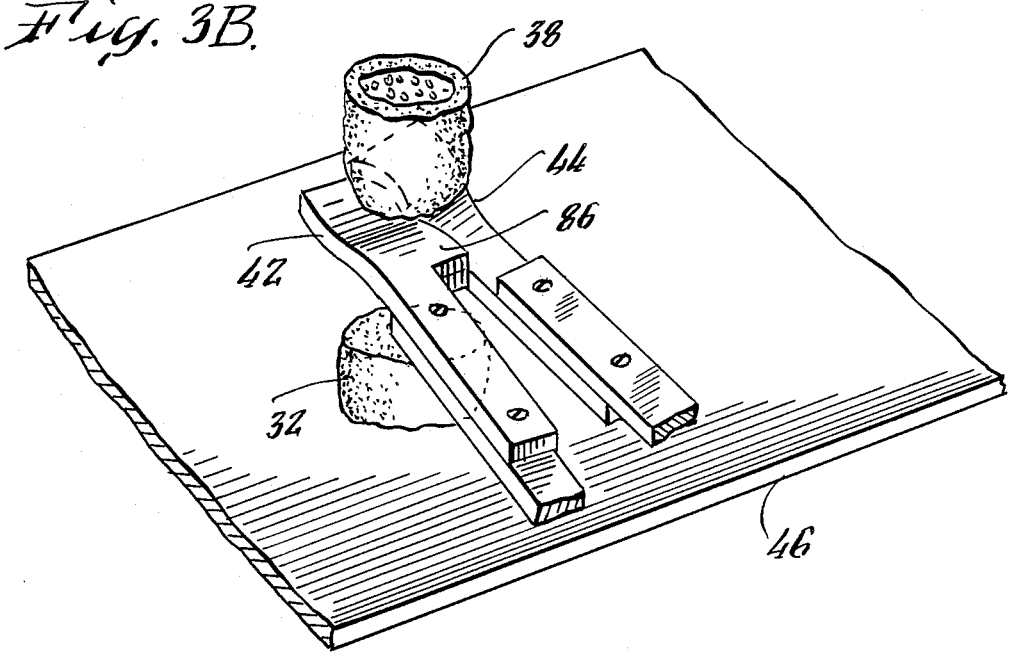

The off-sets of end portions 84, 86 are selected so that opposing end portions 84, 84' and 86, 86' overlap on different sides of the severing plane 78 during a closure of elements 42, 44 as shown in FIGS. 3B and 5. As a result, end portion 84 of severing element 42 slides below end portion 84' of element 44 as shown in FIG. 8 and end portion 86 of element 42 slides over end portion 86' of element 44 as shown in FIG. 9. With such crisscrossing overlap of the elements a more regular severing of the coextrusion 38 is obtained suitable for producing near cylindrically shaped food pieces 32 without lateral displacements. A particularly advantageous feature of severing elements 42, 44 is that severing action is effectively continuous over the length of the severing edges 82, 82' even in the middle region where the severing edges 82, 82' are brought into abutment. As shown in FIG. 3A, severing edge 82' may be slightly recessed in the middle at 83 to partially receive the opposing severing edge 82. This assures a severance of the coextrusion 38 while also preventing impacting contact between edges 82, 82' as the severing elements 42, 44 are closed.

As shown in the crossectional views of FIGS. 7, 8 and 9 and with exaggeration of scale, elements 42, 44 are coated with a low friction material 90 such as teflon. This facilitates a clear separation from coextrusion 38 upon opening of elements 42, 44 with little likelihood of undesirable adhesion of dough.

A particularly effective aspect of severence elements 42, 44 is the use of bluntly shaped severing edges 82, 82' (see FIGS. 7-9). The crossectional shape of edges 82, 82' preferably is rounded convex such as with a semicircular shape. The thickness of the severing edges 82, 82' should also be selected for maximum effectivness. For example, one set of severing elements 42, 44 was found useful with a thickness of 3/16 of an inch and a correspondingly semicircular crossectional shape having a radius of 3/32 of an inch.

These dimensional characteristics for the severing elements 42, 44 may be varied to suit the particular doughs employed in the coextrusion. For example, a stiff outer dough 36 may require a blunter or thicker element than a more pliable stretchable outer dough. Also, when a partial enrobing is desired, a less blunt severing element can be used.

Figure 23:
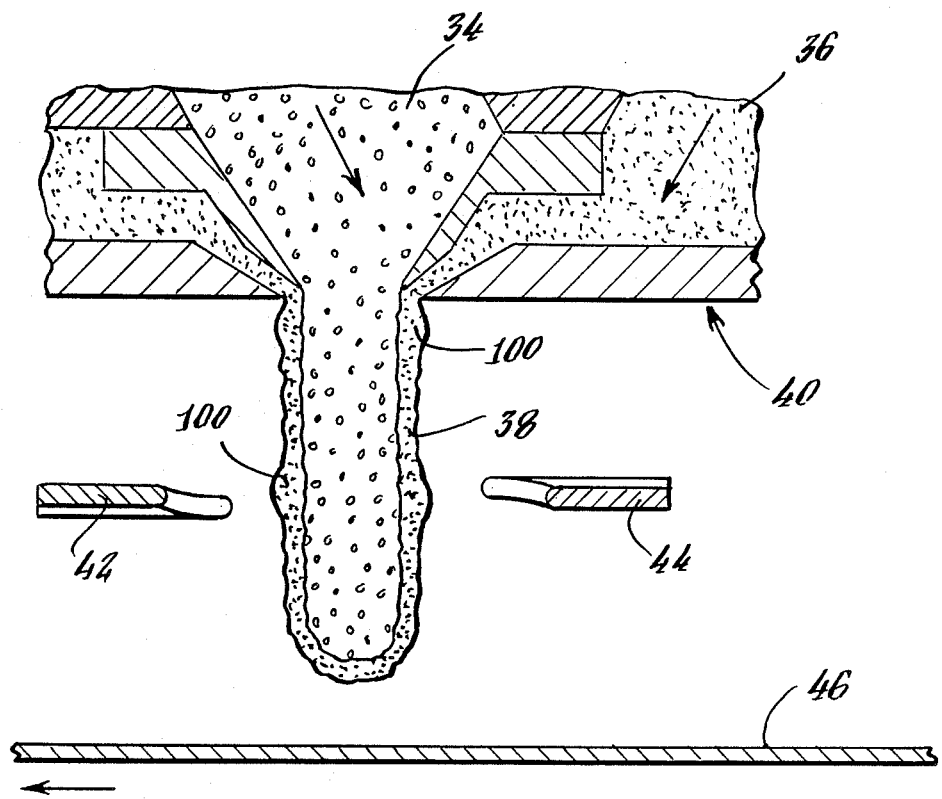
FIG. 23 is a section view of the coextrusion, die and severing elements for an alternate operation in accordance with the invention.
Figure 10:
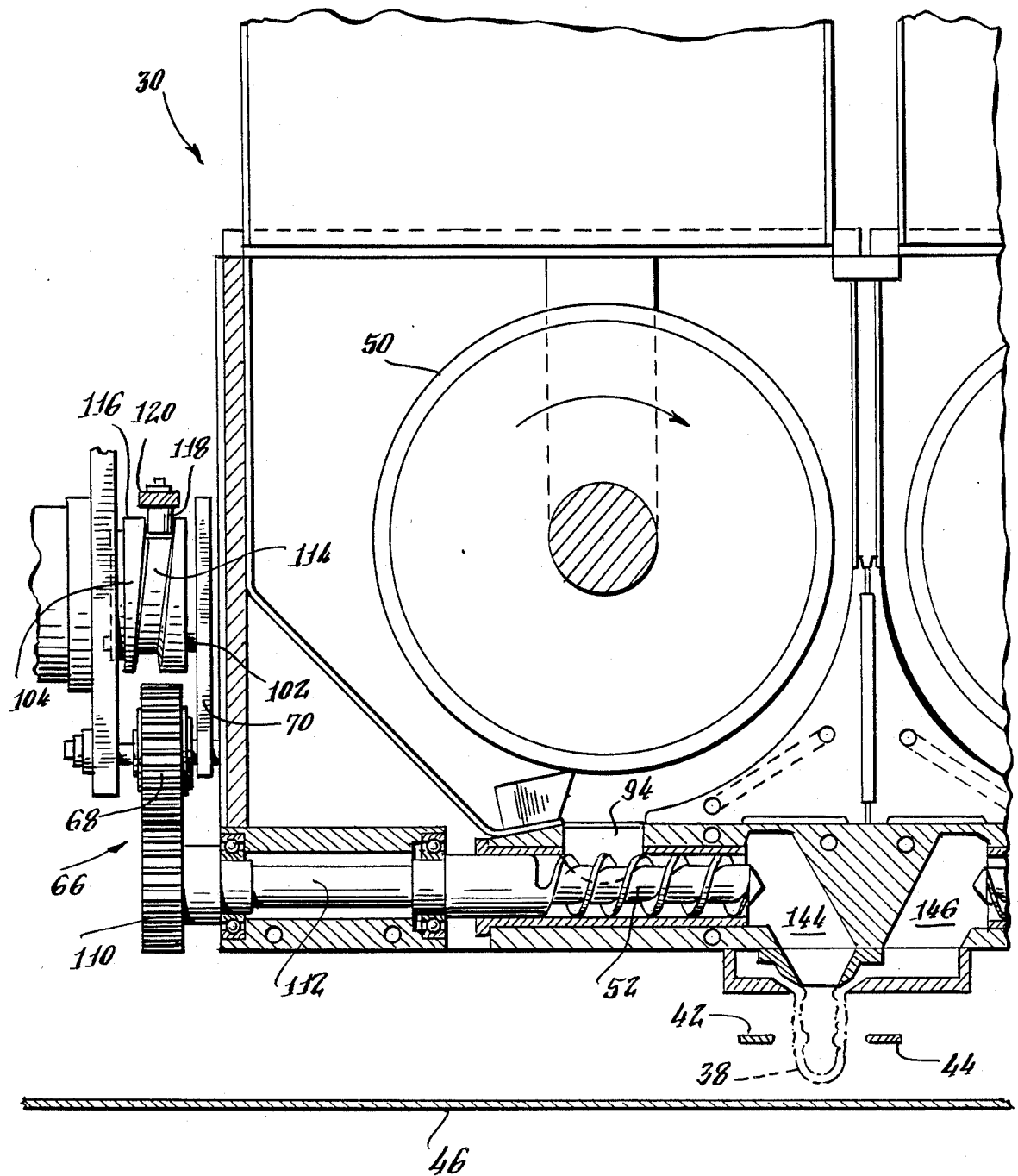

Apparatus 30 employs, as shown in FIGS. 10 and 11, conventional dough feed devices using augers 52, 54 to feed dough supplied by drums 50 through openings 94, 96. In apparatus 30 only auger 52 is intermittently actuated though the speed of auger 54 for outer dough 36 may be varied to increase the flow of outer dough 36. For example, with reference to FIG. 23, the feed rate of outer dough 36 may periodically be increased so as to create annular regions 100 in coextrusion 38 where there exists a relatively greater amount of outer dough 36. In such case the feed of inner dough 34 may be constant or correspondingly reduced to create an even greater amount of outer dough 36 in regions 100 and reduce the presence of voids in coextrusion 38.

Figure 15:
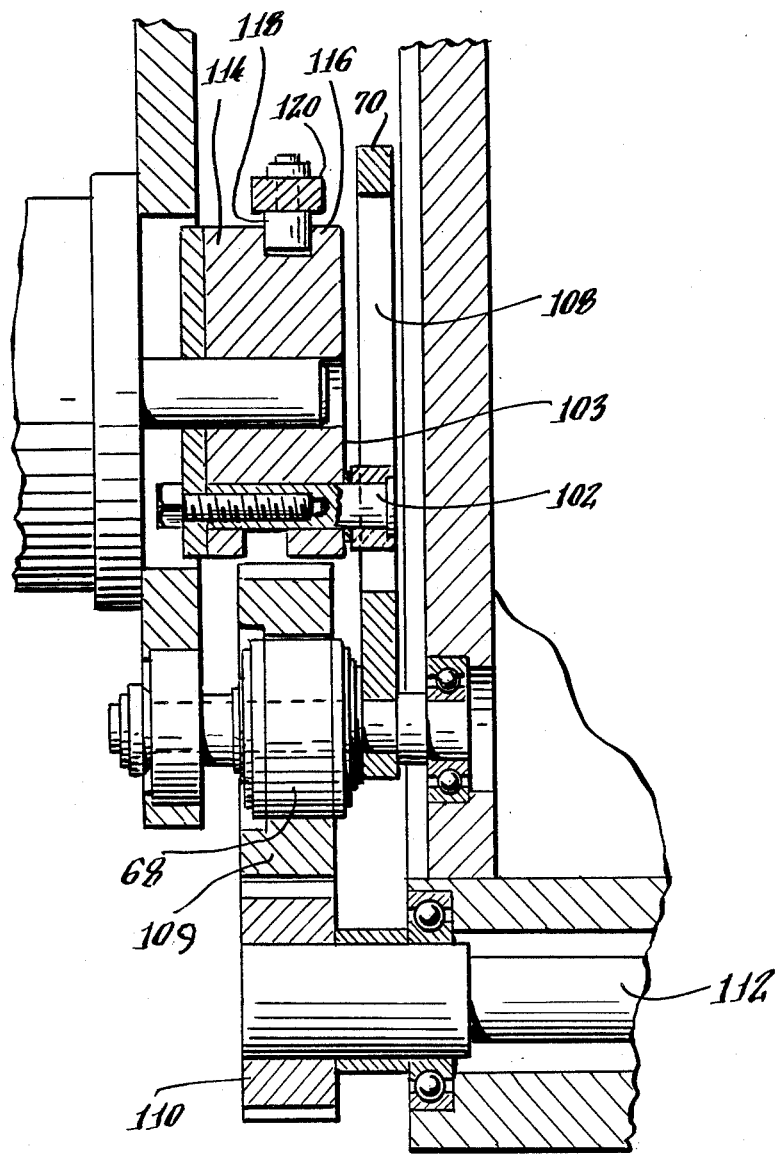
FIG. 15 is a partial section view of the apparatus used to interrupt the feed of the inner dough.
Figure 16:
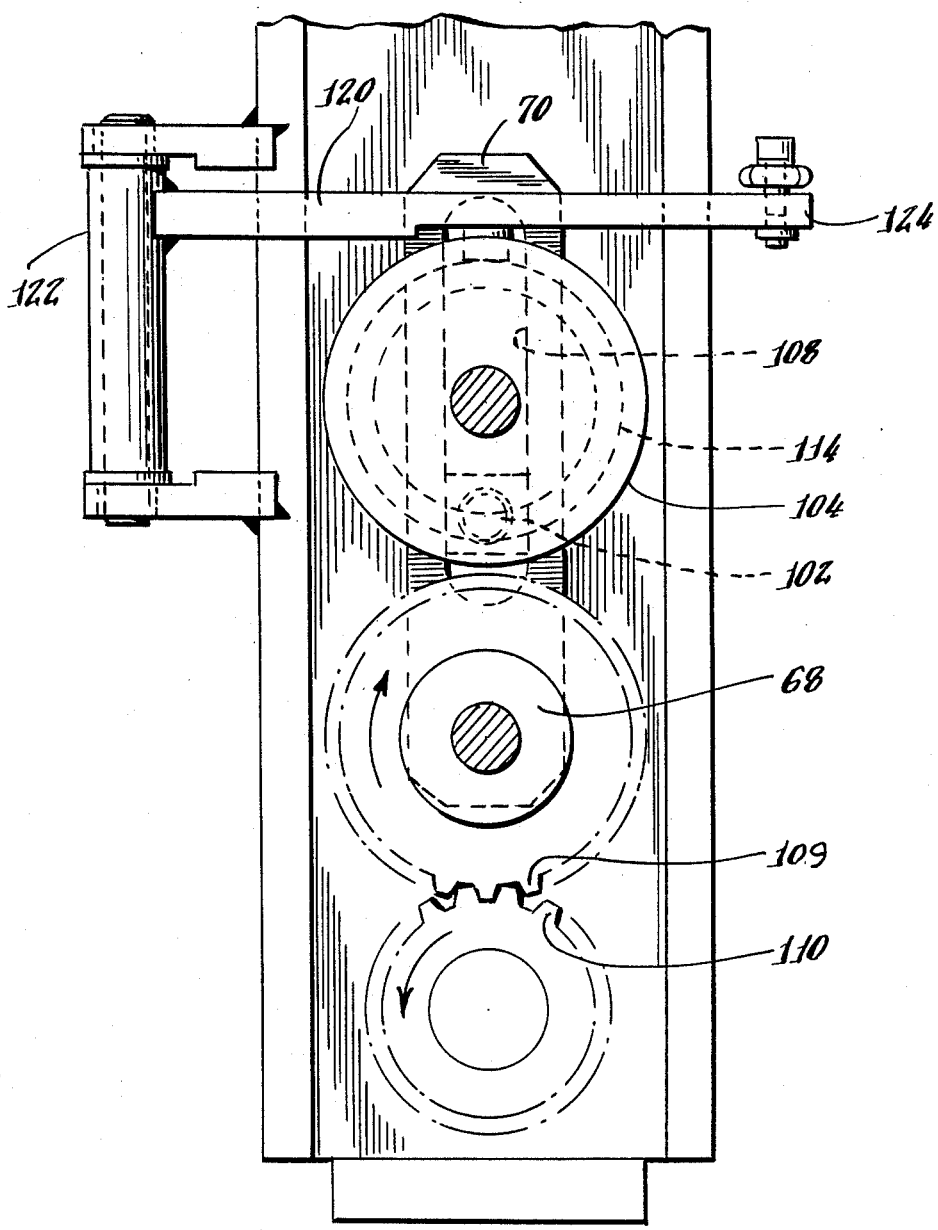
FIG. 16 is an end view in elevation of the apparatus shown in FIG. 15.

Variations in the feed of inner dough may be obtained as shown in FIGS. 10, 15 and 16 with intermittent drive 66 formed with crank 70 which is moved back and forth by a pin 102 mounted in an axial face 103 of a cam wheel 104 connected to a shaft 106 driven by motor 62 (see FIG. 1). Crank 70 has a slot 108 in which pin 102 moves to pivot crank 70 back and forth. The lower end of crank 70 is connected to one way clutch 68 mounted inside a pinion 109. Pinion 109 is operatively connected to drive a gear 110 mounted to a shaft 112 affixed to auger 52. Drive 66 may be a ratchet mechanism. The amount of feed of inner dough 34 can be varied by changing the height of motor 62 and cam wheel 104 and thus the height of the contact region of pin 102 with crank 70.

Coordination between the intermittent drive 66 for inner dough feed auger 52 and the actuation of the mechanism 64 for operating severing elements 42, 44 is obtained by employing cam wheel 104 as the common drive source. Cam wheel 104 is thus provided, as shown in FIG. 10 with a continuous cam groove 114 in a circumferential surface 116. Groove 114 is skewed relative to the axis of rotation. A follower 118 is mounted on a pivot arm 120 and located in groove 114.

Hence, as cam wheel 104 is rotated, crank 70 and pivot arm 120 are moved back and forth to respectively interrupt the drive to auger 52 and thus the feed of inner dough 34 and actuate the severing elements 42, 44 to cut the coextrusion 38 with severing elements 42, 44. The relative timing between these events can be selected by moving the position of follower 102 relative to the location of follower 118. For this purpose cam wheel 104 has a plurality of mounting locations for follower 102.

Figure 14:
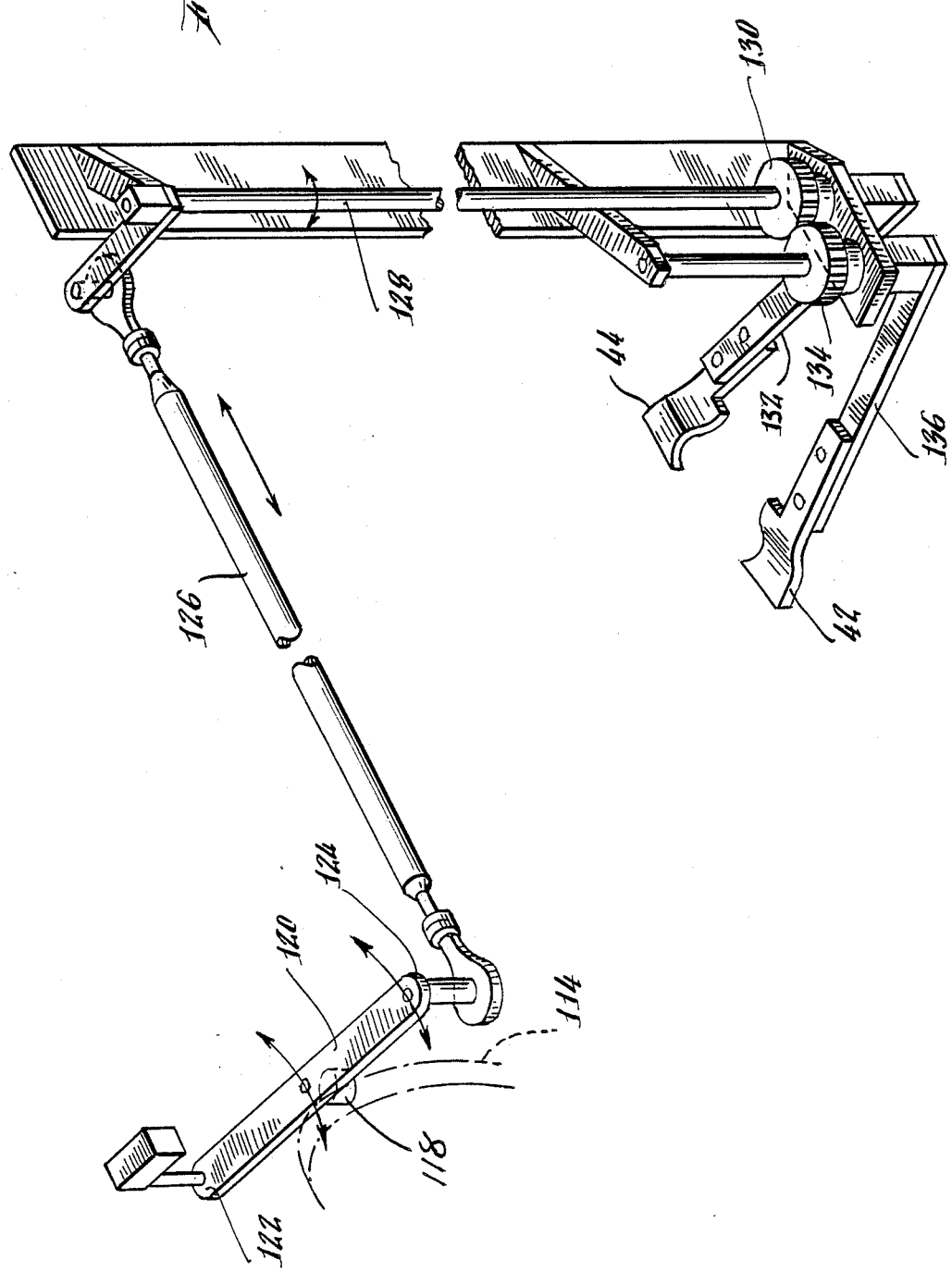
FIG. 14 is an enlarged perspective view of the linkage employed to actuate the severing elements shown in FIG. 1.

Actuation of severing elements 42, 44 is obtained, as shown in FIG. 14, from the back and forth pivot motion of horizontal lever arm 120 having one end 122 pivotally connected to apparatus 30. The other end 124 is coupled by a linkage 126 to a vertically oriented rotatable shaft 128 connected to a pinion 130. The latter is affixed to an arm 132 to which severing element 44 is affixed. A second pinion 134, which is operatively coupled to pinion 130, is affixed to a second arm 136 to which severing element 42 is attached.

The back and forth motion of pivot arm 120 thus causes pinion 134 to rotate back and forth and correspondingly cause severing elements 42, 44 to open and close. The speed and timing of the closure and opening of severing elements 42, 44 depends upon the shape of groove 114 and the rotation of cam wheel 104.

In the operation of apparatus 30 the timing of the interruption of the inner dough auger feed is preferably so selected that an adequate greater amount of outer dough 36 can be obtained in regions 80 (see FIG. 2A) of coextrusion 38. The interruption is preferably not so long as to allow the occurrence of voids in the coextrusion, yet sufficient to establish the preferential greater amount of outer dough for use in enrobing the inner dough during severing. In one satisfactory operation for making food pieces 32, the feed of the inner dough was made at a duty cycle of about 50%, i.e. the inner dough feed was interrupted one-half the time.

During the time that the inner dough feed was interrupted, the severing elements were actuated to cut the coextrusion. The severing action occurs very quickly in a small fraction of the time that the inner dough feed was interrupted. The timing of the severing action can be adjusted relative to the feed interruption, but was found effective when severing took place at about the middle of the interrupt part of the cycle with a spacing S, the distance between the die 40 and severing plane 78, of about 1 ½ inches, and about one hundred and twenty actuations of severing elements per minute. These parameters may be varied depending upon the size and shape desired of the food pieces and the speed with which the coextrusion 38 emerges from die 40.

Figure 12:
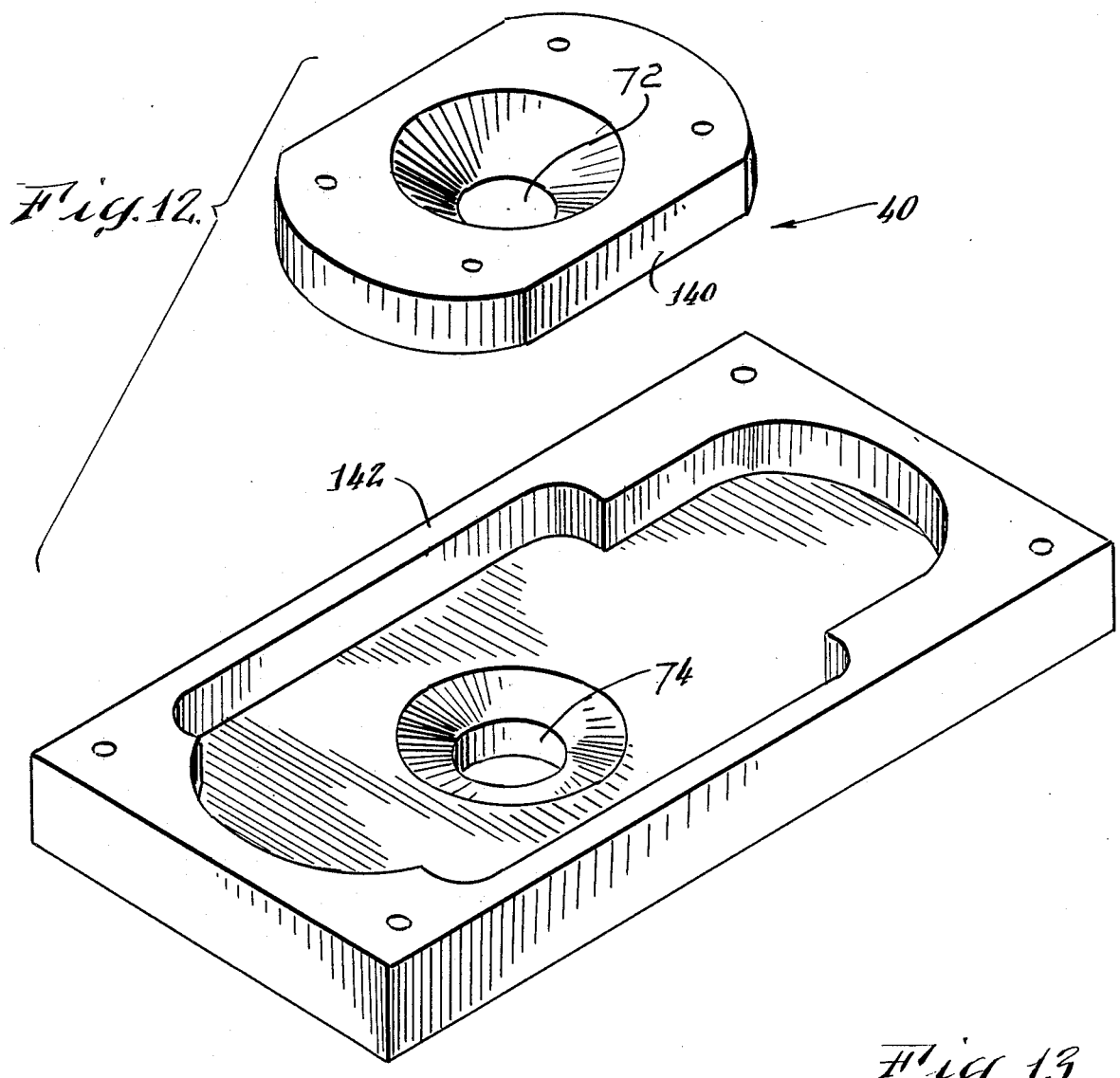
FIG. 12 is an exploded perspective view of die pieces used to form a die in the apparatus of FIG. 1.
Figure 13:
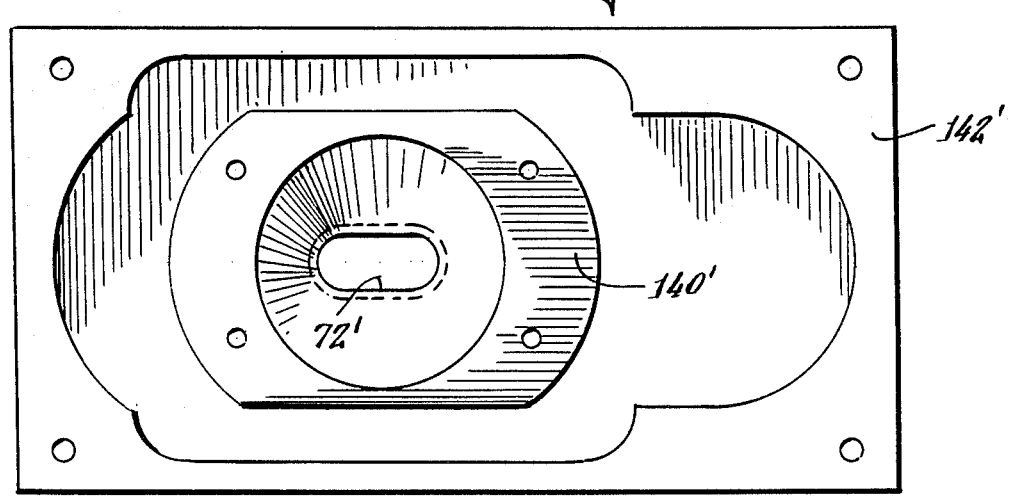
FIG. 13 is a top plan view of the die using the die pieces shown in FIG. 12.

The shape of food pieces 32 also is a function of the size and shape of die 40. This, as shown in FIGS. 12 and 13 may be formed in different ways. The die 40 in FIG. 12 is formed of two parts, an inner die 140 for inner dough 34 and an outer die 142 for outer dough 36. The die openings 72 and 74 are shown as circular and respectively communicate with the discharge ports 144, 146 (see FIGS. 10, 11) of auger dough feeds 52, 54 respectively.

In die 40' of FIG. 13, the die openings 72', 74' (only 72' being shown) are shaped in a slightly oblong manner. This is done so as to compensate for the pinching action of severing elements 42, 44 to thus end up with more near cylindrically shaped food pieces 32.

With the apparatus 30 food pieces 32 can be made at a high rate. For larger production, however, a need exists to enlarge the apparatus and improve operational control. Thus, with reference to FIGS. 17-19 an apparatus 150 is shown for simultaneously producing from a plurality of coextrusions a plurality of rows 152 of food pieces 32 on a correspondingly wide conveyor 154.

Apparatus 150 includes dough hoppers such as 156 for inner dough 34 and 158 for outer dough 36. Each hopper 156, 158 has a feed roll 160 to deliver dough at the entry ports (not shown) of a plurality of augers 52, 54 (only 52 being visible in the view of FIG. 17). The inner dough augers 52 are intermittently driven from a common pulse controlled drive 161 with the rotational drive coupled from one auger to the next through a gear train 162. This means that successive augers 52 are rotated in opposite directions and therefore both left-hand and right-hand auger threads are used. A common motor 62 supplies rotational drive for inner dough feed augers 52 and similarly motor 60 provides a drive for outer dough augers 54. Motor 62 is actuated in a pulse mode with a pulse delivered on line 163.

Figure 17:
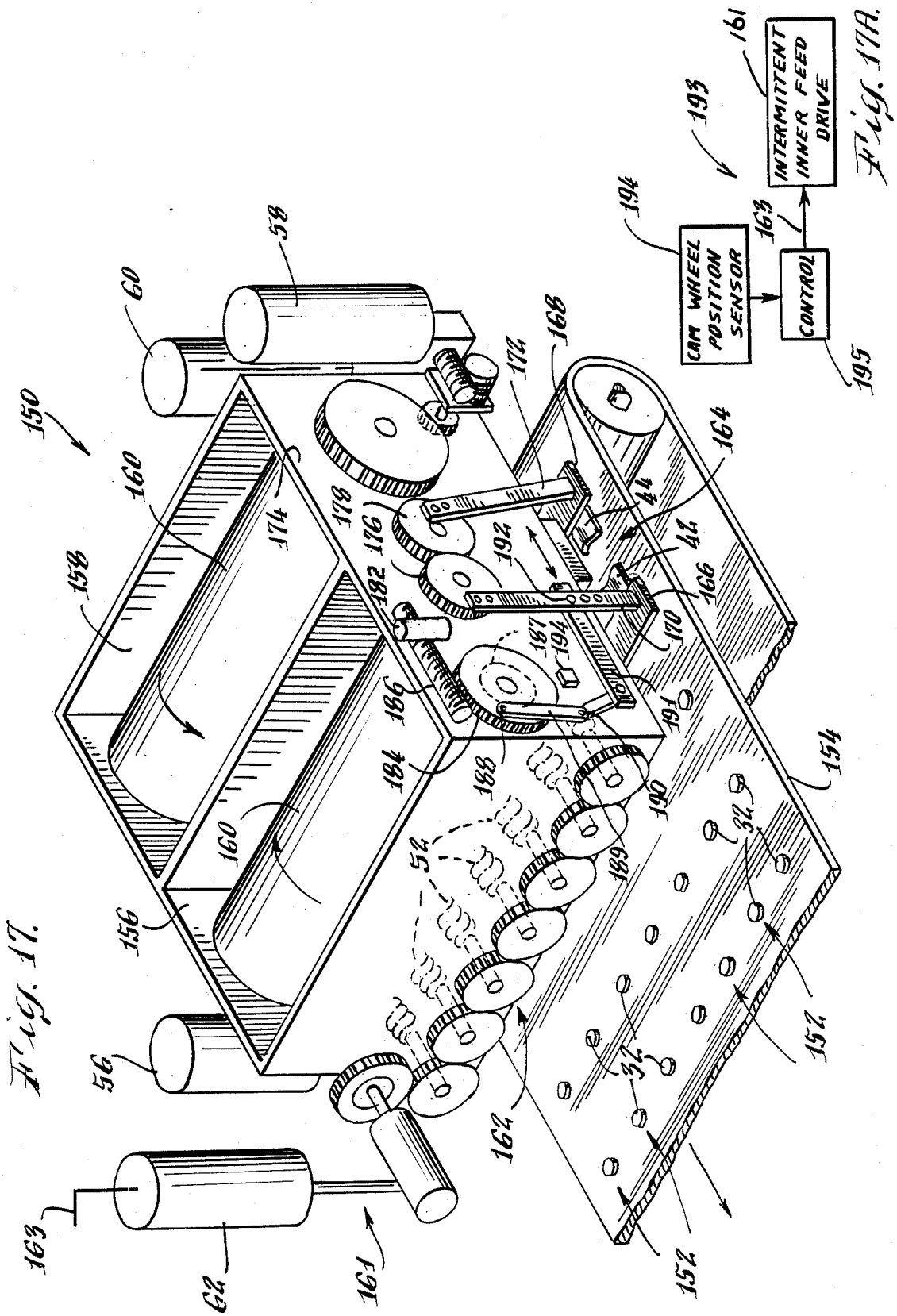
FIG. 17 is a perspective view of a multiple food piece row producing apparatus in accordance with the invention.
Figure 18:
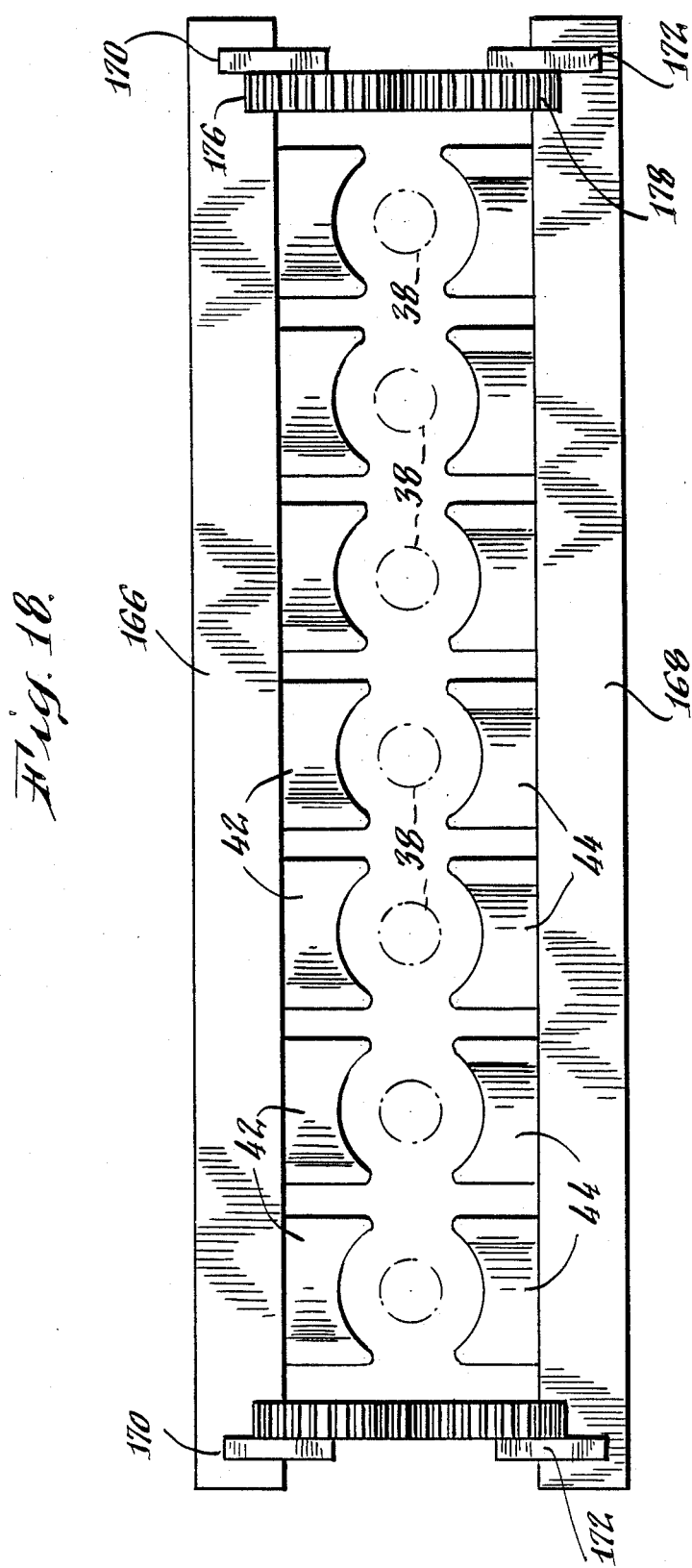
FIG. 18 is a plan view of a severing element assembly used in the apparatus shown in FIG. 17.

Severing of the plurality of coextrusions produced by apparatus 150 is obtained with a severing mechanism 164 formed with a plurality of sets of severing elements 42, 44 mounted on respective arms 166, 168, see FIGS. 17, 18. Arms 166, 168 are suspended from brackets 170, 172 at axial ends 174, 174' of apparatus 150 with the brackets 170, 172 affixed to gears 176, 178 respectively. A severing drive motor 182 is shown connected to a cam wheel 184 through a reduction gear 186. Cam wheel 184 has a cam slot 187 engaged by a follower 188 connected to a lever arm 189 which is pivoted at 190 and connected to a link arm 191. The latter arm 191 is connected to bracket 170 at a pivot point 192.

Operation of apparatus 150 is obtained with a control 193, see FIG. 17A, with which the timing of the severing action can be synchronized with and phased relative to the inner feed auger drive. A proximity sensor 194 is employed to sense, for example, the position of cam wheel 184 and thus generate a synchronization signal to active inner feed 161. A signal representative of the sensed position is applied to a control 195 which generates an output severing signal on line 163 to actuate inner feed drive 161. Control 195 provides its severing signal at such time and with such power as will assure the desired drive for motor 62. Control 195 may thus include such variable delays and signal amplifiers needed to operate drive 161. Sensor 194 may be a magnetic sensor of a type well known in the art. Variations in the closure of elements 42, 44 can be obtained by changing the height of the pivot 192 between link arm 191 and bracket 170. Link arm 191 preferably is in the form of a turnbuckle to be able to adjust the positions of severing elements 42, 44.

Severing elements 42, 44 may be formed in a different manner as illustrated in FIGS. 19-22 with elements 200, 202. Each element is formed of a pair of separate planar segments 204, 206. The segments 204, 206 each have a concave shaped severing edge 208 that complement each other to form a semicircular severing shape as illustrated for elements 42, 44 in FIG. 4. Segments 204, 206 are mounted to support arms 210, 212 in such manner that they are off-set from each other on each arm and opposing segments can converge to overlap as illustrated in FIG. 20.

Having thus described several apparatuses and methods for making food pieces wherein an inner food is enrobed by an outer food, the various advantages of the invention can be understood. Variations can be implemented by one skilled in the art without departing from the scope of the invention as defined by the following claims.

What is claimed is:

1. A method for the continuous production of individual food pieces of coextruded foods at a food station where the food pieces are transported away by a conveyor comprising the steps of:

coextruding from a die said inner food with and inside said outer food in a downwardly direction so as to form a coextrusion below the die;

horizontally severing the coextrusion while it is unsupported from below at a place which is a predetermined distance below the die with a pair of bluntly-shaped elements that move in a horizontal plane and overlap each other at the severing place so as to simultaneously draw the outer food both above and below the severing place over the inner food to form food pieces having the inner food enrobed by the outer food and dropping the severed food pieces from said place onto the conveyor;

periodically varying the rate of flows of the inner and outer foods relative to each other so as to produce in said coextrusion at said predetermined distance below the die a relatively greater amount of outer food; and severing the coextrusion near said greater amount of food to enhance the enrobing of the inner food.

2. The method as claimed in claim 1 wherein the severing step is done at a place selected to be slightly below the portion of the extrusion where said greater amount of outer food is present to form food pieces wherein said inner food is exposed.

3. The method as claimed in claim 1 wherein said severing step comprises the steps of:
periodically interrupting the flow of the inner food for predetermined intervals which have a duration that is generally about equal to the duration that said inner food is extruded, while continuing to extrude the outer food during said intervals.

4. The method as claimed in claim 3 wherein said severing and drawing steps commence a predetermined time following the start of each interval.

5. The method as claimed in claim 4 wherein said severing and drawing steps commence at a time which falls in the period that extends from about one-third to about two-thirds of an interval.

6. The method as claimed in claim 1 wherein said coextrusion of said inner and outer foods has a crossection with an elongation that is aligned generally along the direction of the severing step so as to yield a generally cylindrical food piece after severing and drawing.

7. An apparatus for the continuous production of individual food pieces comprising:
means for forming a coextrusion of an inner food with and inside an outer food; and
means including a pair of opposingly positioned elements having bluntly-shaped severing edges, which are circumferentially concavely shaped at their blunt shape so as to correspondingly arctuately engage the coextrusion, for horizontally-moving the elements to each other, with ends of the respective edges of the elements overlapping each other to sever the coextrusion below the extruding means while simultaneously drawing the outer food above and below the elements over the inner food to form food pieces having the inner food enrobed by the outer food;
said coextrusion forming means including a die shaped to provide a coextrusion of said first and second foods with a crossectional shape having an elongation in the direction in which said severing elements are moved to sever the coextrusion.

8. The apparatus as claimed in claim 7 and further comprising:
means for periodically varying the rate of flows of the inner and outer foods relative to each other so as to produce relatively greater amounts of outer food at intervals spaced along the coextrusion and located below the extruding means in the path of the severing elements.

9. An apparatus for the continuous production of individual food pieces at a forming station where the food pieces are transported away by a conveyor comprising:
means for forming a plurality of adjacently spaced coextrusions of a first food with and inside a second food and extending in a suspended fashion in a downwardly direction,
a plurality of pairs of cooperating severing elements, with each pair mounted in juxtaposed relationship with respect to a said suspended coextrusion and with said elements in each pair being mounted to coact with the other element in overlap relationship to sever the suspended coextrusion between the elements in a pair at a place below the formation of said coextrusion and where it is unsupported from below,
means for jointly moving said pairs of severing elements to cause a severing of said adjacently spaced suspended coextrusions at the same time, said severing elements having severing edges that are shaped to draw the outer food at each extrusion over the inner food during the severing.

10. The apparatus as claimed in claim 9 wherein said moving means includes:
a pair of parallel mounted arms, each of said arms carrying one of the severing elements of said plurality of pairs,
said arms being each pivotally mounted and means for coupling said arms to each other so that pivot motion of one arm causes pivot motion of the other arm to operatively actuate pairs of severing elements, and
means to cyclically pivot said one arm.

* * * * *